United States Patent [19]
Taylor et al.

[11] Patent Number: 5,477,284
[45] Date of Patent: Dec. 19, 1995

[54] DUAL MODE OVERHEAD PROJECTION SYSTEM USING FIELD EMISSION DEVICE

[75] Inventors: Robert H. Taylor, Richardson; Charles E. Primm, Plano; Kenneth G. Vickers, Whitesboro; Lester L. Hodson, McKinney, all of Tex.

[73] Assignee: Texas Instruments Incorporated, Dallas, Tex.

[21] Appl. No.: 356,809

[22] Filed: Dec. 15, 1994

[51] Int. Cl.$^6$ .................................................. G03B 21/00
[52] U.S. Cl. ................................... 353/122; 353/DIG. 3
[58] Field of Search .................................... 353/120, 122, 353/DIG. 3, DIG. 5; 313/495, 309

[56] References Cited

U.S. PATENT DOCUMENTS

| | | | |
|---|---|---|---|
| 4,857,799 | 8/1989 | Spindt et al. | 313/495 |
| 4,940,916 | 7/1990 | Borel et al. | 313/306 |
| 5,194,780 | 3/1993 | Meyer | 315/169.3 |
| 5,194,884 | 3/1993 | Parker et al. | 353/122 |
| 5,225,820 | 7/1993 | Clerc | 340/752 |
| 5,353,075 | 10/1994 | Conner et al. | 353/122 |
| 5,373,333 | 12/1994 | Kawada et al. | 353/122 |

*Primary Examiner*—William C. Dowling
*Attorney, Agent, or Firm*—Rose Alyssa Keagy; Wade James Brady, III; Richard L. Donaldson

[57] ABSTRACT

A dual mode projection system 30 includes a standard field emission device (FED) display panel 44 within a projector base 32. In this way, the light source of a standard overhead projector is replaced by FED panel 44. FED panel 44 is positioned within projector base 32 such that the viewing surface of panel 44 is substantially flush with the top surface of projector base 32. Thus, in a first mode of this dual mode projection system 30, FED panel 44 provides the light source for projecting an image of graphics 48 printed on transparency 46 onto another surface such as a projection screen or wall. FED panel 44 is coupled via connector 36 in projector base 32 and signal cable 38 to host system 40. Host system 40 may comprise the processing unit of a standard notebook computer including a keyboard 42 for data entry. Display information created by the electronics in host system 40 is transmitted through cable 38 to FED display 44. An image 50 created on FED display 44 is projected via lens system 34 onto a large surface such as a screen or wall. The luminescence needed to display image 50 created by FED panel 44 onto a separate surface is provided by the FED panel 44, and no additional light source is required for this projection function. Thus, in the second mode of this dual mode projection system 30, FED panel 44 provides a display of computer-generated images projected onto another surface. The first and second operational modes may be combined to provide a concurrent transparency and computer-generated video display.

11 Claims, 2 Drawing Sheets

DUAL MODE OVERHEAD PROJECTION SYSTEM USING FIELD EMISSION DEVICE

RELATED APPLICATION

This application includes subject matter which is related to U.S. Patent Application Ser. No. 08/315,418, "Multimedia Field Emission Device Portable Projector," (Texas Instruments, Inc. Docket No. T1-19003), filed Sep. 29, 1994.

TECHNICAL FIELD OF THE INVENTION

The present invention relates generally to projection devices and, more particularly, to a dual mode overhead projection system using a field emission display device.

BACKGROUND OF THE INVENTION

Standard overhead projectors, which have been used for many years, project images onto a screen from a thin transparent plastic sheet, commonly referred to as a transparency. As shown in FIG. 1, projector 10 includes a base 12 housing a light source, and a lens system 14. A transparency 16 is placed on top of base 12 where light emitted from the light source shines through transparency 16. Lens system 14 directs the image of the information printed on transparency 16 onto screen 18. A disadvantage of a standard overhead projection system is that it cannot interface with a computer. The system is capable of displaying only the image printed on a transparency. Other disadvantages of a standard overhead projection system are that it is too heavy to be easily portable, it produces a great deal of heat, and it consumes a large amount of power.

Other overhead projector systems in use today, however, are capable of interfacing with computers. One such projector system is the BARCO Data 600 manufactured by BARCO Projection Systems and shown as prior art in FIG. 2. Projection system 20 uses three monochrome cathode ray tube (CRT) projection tubes 22, each individually projecting a monochromatic light signal corresponding to the image of a primary color, which images are converged using colored filters and lenses 24 to create a composite color image on screen 26. Projection system 20 can be interfaced to a computer (not shown), thereby allowing the images appearing on the computer's display to also be projected onto screen 26. However, such a system cannot be used to project a image printed on a transparency. Other disadvantages of this type of projection system are that it is not portable, and it is large because of the physical depth required by the CRT technology.

There is no known projection system which is capable of projecting both a computer-generated video image and an image printed on a transparency, either selectively or concurrently. Such a system is highly desirable in order to provide a true multimedia presentation. Other features which may be desired in such a system include portability, reduced power consumption and reduced heat generation.

SUMMARY OF THE INVENTION

In accordance with the principles of the present invention, there is disclosed herein a field emission device projection apparatus which comprises a projector base having a light source. The light source comprises a field emission device panel. The apparatus also comprises a means coupled to the panel for selectively providing a display image and a backlighting source image for a transparency. Finally, the apparatus comprises a lens system which projects the images onto a surface separated from the apparatus.

In accordance with a preferred embodiment of the present invention, the image providing means comprises a host system for generating image data and control signals to the panel. Also, the image providing means further includes switch means for providing operation selectively as a backlighting source for a transparency and as a display image source. Alternatively, the image providing means further includes switch means for providing concurrent operation as a backlighting source for a transparency and as a display image source.

BRIEF DESCRIPTION OF THE DRAWING

The foregoing features of the present invention may be more fully understood from the following detailed description, read in conjunction with the accompanying drawings, wherein.

DESCRIPTION OF THE PREFERRED EMBODIMENT

Figure 1:
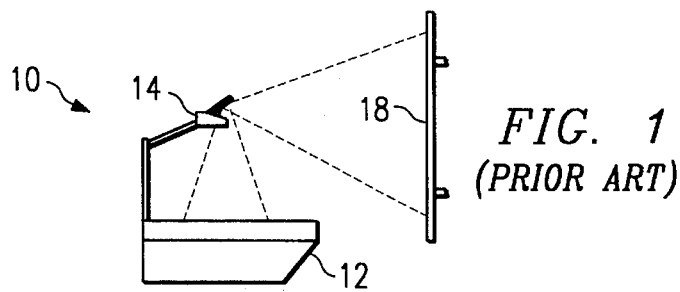
FIG. 1, already described, illustrates a prior art standard projection system.
Figure 2:
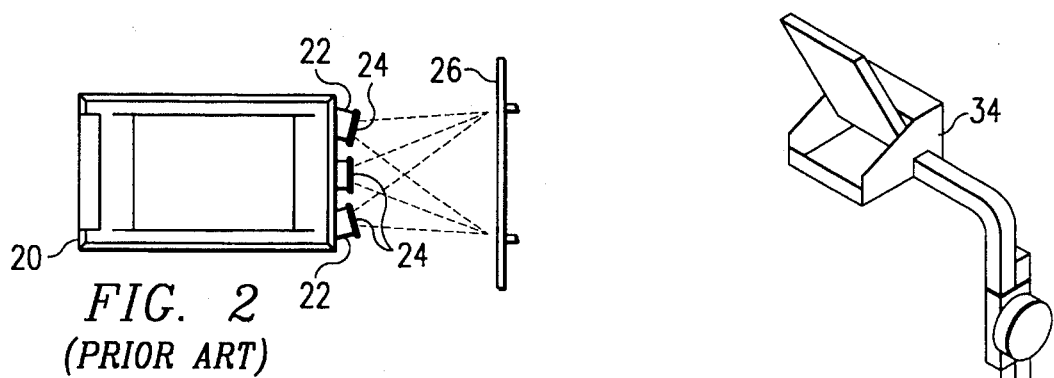
FIG. 2, already described, illustrates a prior art overhead projection system which interfaces to a computer.
Figure 3:
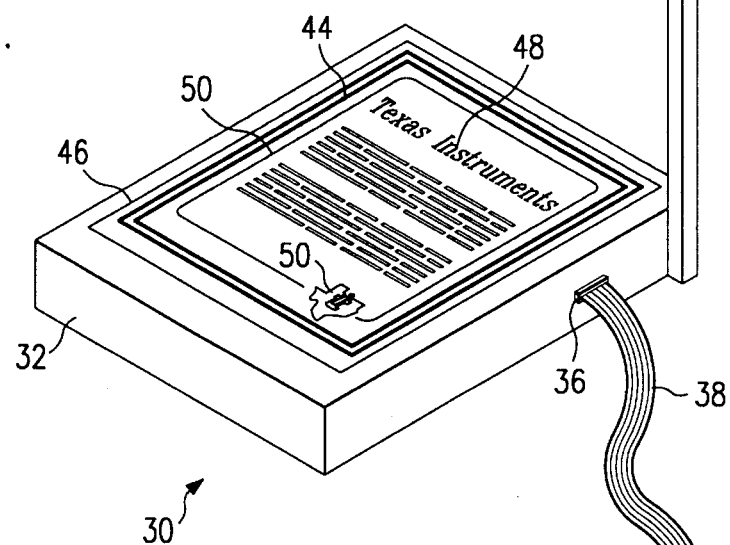
FIG. 3 illustrates a dual mode projection system in accordance with the present invention.
Figure 3:
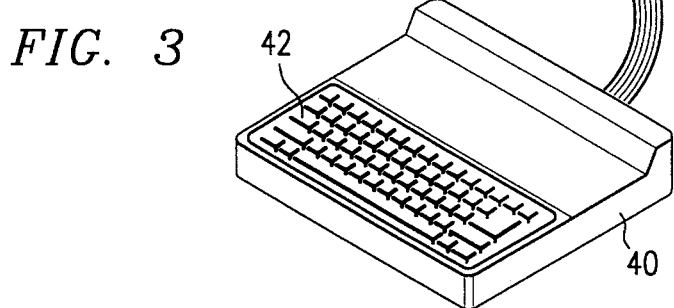

FIG. 3 illustrates a dual mode projection system in accordance with the present invention. As shown, a field emission device (FED) overhead projection system 30 is constructed by placing a standard FED display panel 44 within a projector base 32. In this way, the light source of the standard overhead projector (of FIG. 1) is replaced by FED panel 44. FED panel 44 is positioned within projector base 32 such that the viewing surface of panel 44 is substantially flush with the top surface of projector base 32. The light provided by panel 44 may be monochromatic, of any single color, or it may provide a polychromatic patterned effect. Thus, in a first mode of this dual mode projection system 30, FED panel 44 provides the light source for projecting an image of graphics 48 printed on transparency 46 onto another surface such as a projection screen (not shown). The structure and method of operation of a standard FED panel is explained in greater detail later with reference to FIG. 4.

FED panel 44 is coupled via connector 36 in projector base 32 and signal cable 38 to host system 40. Host system 40 may comprise the processing unit of a standard notebook computer including a keyboard 42 for data entry. Display information created by the electronics in host system 40 is transmitted through cable 38 to FED display 44. An image 50 created on FED display 44 is projected via lens system 34 onto a large surface (not shown) such as a screen or wall. The luminescence needed to display image 50 created by FED panel 44 onto a separate surface is provided by the FED panel 44; therefore no additional light source is required to be included within base 32 for this projection function. Image 50 may be text or graphic, it may be a border, a logotype, or a background pattern, it may be monochromatic or polychromatic, and it may be still or animated. Thus, in the second mode of this dual mode projection system 30, FED panel 44 provides a display of computer-generated images projected onto another surface such as a projection screen (not shown). Information which is input to host system 40 by, for example, keyboard 42, may be used to select the operational mode of overhead projection system 30.

An FED flat panel display arrangement is disclosed in U.S. Pat. No. 4,857,799, "Matrix-Addressed Flat Panel Display," issued Aug. 15, 1989, to Charles A. Spindt et al., incorporated herein by reference. This arrangement includes a matrix array of individually addressable light generating means of the cathodoluminescent type having cathodes combined with luminescing means of the CRT type which reacts to electron bombardment by emitting visible light. Each cathode is itself an array of thin film field emission cathodes on a backing plate, and the luminescing means is provided as a phosphor coating on a transparent face plate which is closely spaced to the cathodes.

The backing plate disclosed in the Spindt et al. ('799) patent includes a large number of vertical conductive stripes which are individually addressable. Each cathode includes a multiplicity of spaced-apart electron emitting tips which project upwardly from the vertical stripes on the backing plate toward the face plate. An electrically conductive gate electrode arrangement is positioned adjacent to the tips to generate and control the electron emission. The gate electrode arrangement comprises a large number of individually addressable, horizontal stripes which are orthogonal to the cathode stripes, and which include apertures through which emitted electrons may pass. The gate electrode stripes are common to a full row of pixels extending across the front face of the backing structure, electrically isolated from the arrangement of cathode stripes. The anode is a thin film of an electrically conductive transparent material, such as indium tin oxide, which covers the interior surface of the face plate.

The matrix array of cathodes is activated by addressing the orthogonally related cathodes and gates in a generally conventional matrix-addressing scheme. The appropriate cathodes of the display along a selected stripe, such as along one column, are energized while the remaining cathodes are not energized. Gates of a selected stripe, such as along one row orthogonal to the selected cathode stripe are also energized while the remaining gates are not energized, with the result that the cathodes and gates of a pixel at the intersection of the selected column and row will be simultaneously energized, emitting electrons so as to provide the desired pixel display.

Other advances in field emission display technology are disclosed in U.S. Pat. No. 4,940,916, "Electron Source with Micropoint Emissive Cathodes and Display Means by Cathodoluminescence Excited by Field Emission Using Said Source," issued 10 Jul. 1990 to Michel Borel et al.; U.S. Pat. No. 5,194,780, "Electron Source with Microtip Emissive Cathodes," issued 16 Mar. 1993 to Robert Meyer; and U.S. Pat. No. 5,225,820, "Microtip Trichromatic Fluorescent Screen," issued 6 Jul. 1993, to Jean-Frédéric Clerc. These patents are also incorporated herein by reference.

The Clerc ('820) patent discloses a trichromatic field emission flat panel display having a first substrate comprising the cathode and gate electrodes, and having a second substrate facing the first, including regularly spaced, parallel conductive stripes comprising the anode electrode. These stripes are alternately covered by a first material luminescing in the red, a second material luminescing in the green, and a third material luminescing in the blue, the conductive stripes covered by the same luminescent material being electrically interconnected.

Today, FED panels are manufactured by combining the prior art of many practitioners, including the teachings of the Spindt et al. ('799) and Clerc ('820) patents. One typical prior art FED display is schematically illustrated in cross section in FIG. 4, and comprises an anode plate 62 and an emitter plate 64. Anode plate 62 includes phosphor stripes 66 emitting red, green and blue light energy. The image created by phosphor stripes 66 is observed from the side which is opposite to the phosphor excitation, as indicated in FIG. 4.

Figure 4:
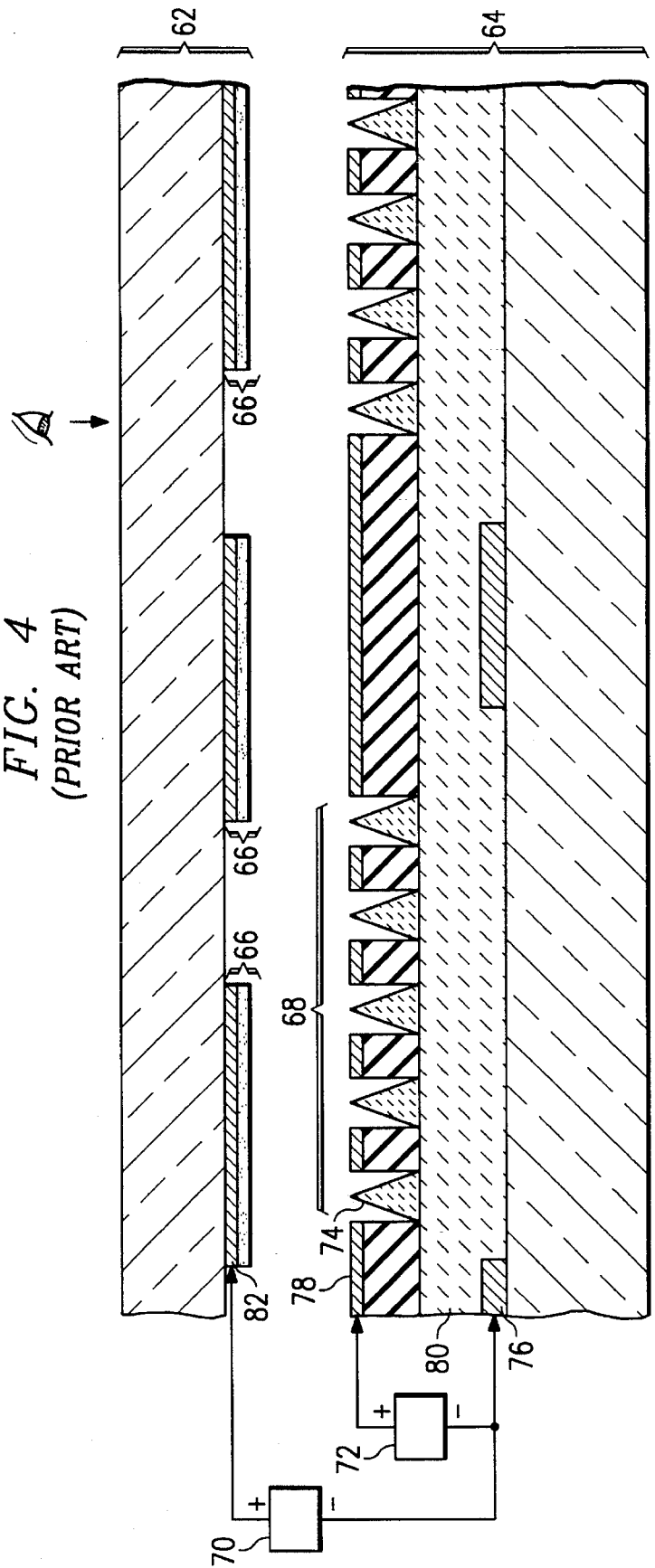
FIG. 4 illustrates a cross-sectional view of a portion of a prior art field emission display.

No true scaling information is intended to be conveyed by the relative sizes and positioning of the elements of anode plate 62 and the elements of emitter plate 64 as depicted in FIG. 4. For example, in a typical FED shown in FIG. 4 there are approximately one hundred arrays 68 of microtips and there are three color stripes 66 per display pixel.

The process of field emission from the device illustrated in FIG. 4 includes extracting electrons from microtip emitters 74 by the application of a potential 72 between cathode electrode 76 and gate electrode 78, typically on the order of 70–100 volts. The material of layer 80, intermediate cathode electrode 76 and microtip emitters 74, provides a ballasting resistance. Electrons emitted from microtip emitters 74 are accelerated selectively toward anode electrodes 82 by the application of an accelerating potential 70, typically on the order of 300–800 volts.

The process of producing each display frame using a typical trichromatic field emission flat panel display includes accelerating the electrons initially to the red anode stripes while sequentially addressing the row lines (gate electrodes) with the corresponding red video data for that frame applied to the column lines (cathode electrodes), switching the accelerating potential to the green anode stripes while sequentially addressing the rows lines for a second time with the corresponding green video data for that frame applied to the column lines, and switching the accelerating potential to the blue anode stripes while sequentially addressing the row lines for a third time with the corresponding blue video data for that frame applied to the column lines. This process is repeated for each display frame.

Returning to FIG. 3, it will be understood from the foregoing that FED panel 44 comprises an anode plate having a cathodoluminescent phosphor coating facing an emitter plate, the phosphor coating creating an image observed from the side opposite to its excitation. Standard FED panels have an luminescence of approximately 120 ft-L (foot-lamberts); however, standard projection systems require a luminance of approximately 600 ft-L to adequately display a projected image. The increased luminance needed in the embodiment of FIG. 3 is obtained by increasing the voltage on the anode plate of FED panel 44. Using standard triode mode techniques commonly known in the industry, a ten-fold increase in voltage results in a one hundred-fold increase in luminance. Therefore the voltage of the anode does not have to be increased greatly above the standard levels typically used for notebook computer applications in order to increase the luminance of the panel from 120 ft-L to 600 ft-L. In the present example, such increased voltage may illustratively be fifty percent higher than what is typically used for display purposes.

Since, in the present example, the anode of FED panel 44 must be powered at an elevated voltage, it may be necessary to increase the spacing between the anode and emitter cathode plates. This increased spacing is customary in the industry in situations such as this where it is necessary to protect the cathode plate from damage caused from high voltage breakdown between the anode and cathode due to the small vacuum spacing.

Increasing the voltage at the anode results in an increase in the anode current and, therefore, the heat created by panel 44. In the present example, the additional heat may be mechanically dissipated by the addition of metal fins or frame (not shown) to the structure of FED panel 44 and/or within the structure of projector base 32.

It will be recognized that the two modes of operation of the field emission device overhead projection system 30 of the present invention, that of (1) providing the light source for projecting an image of graphics 48 printed on a transparency 46, and (2) providing a display of computer-generated images projected onto a surface such as a projection screen, may be combined. More particularly, the connection of host system 40 to FED panel 44 allows panel 44 to be used as a light source for projecting the image of graphics material 48 on transparency 46 while concurrently projecting a computer-generated image 50, e.g., border, logotype, background pattern, etc., either still or animated, through the transparency 46 and thereby enhance the image displayed on the projection screen. For example, transparency 46 may contain printed words 48 which summarize a speaker's discussion, while FED panel 44 will simultaneously project through transparency 46 a decorative border 50, or possibly animated video images. Selection of the desired mode of operation, either the first mode, the second mode, or the concurrence of the first and second modes, may be controlled by an operator's interface, such as keyboard 42 of host system 40.

In summary, by connecting a video source such as host system 40 to an overhead projection system 30 having an FED light source 44, the FED panel 44 may be used as a light source to display an image 48 printed on a transparency 46, or as a projector for a computer-generated image 50, or, concurrently providing the light source for the projection of an image 48 printed on a transparency 46 while simultaneously projecting a computer-generated image 50 created by FED panel 44 under the control of the host system 40.

Several other variations of the above would be understood by one skilled in the art and are considered to be within the scope of the present invention. For example, the FED panel 44 may project not merely a white light, but may instead project any other single color light, or a mixture of lights of various colors.

The use of FED panels within projection systems, as disclosed herein, provides numerous advantages. Such systems reduce power consumption, generate far less heat and take up less space than other technologies such as incandescent, liquid crystal and BARCO-type systems. FED projection systems are relatively portable, convenient to use and are capable of the dual mode operation described earlier.

While the principles of the present invention have been demonstrated with particular regard to the structure disclosed herein, it will be recognized that various departures may be undertaken in the practice of the invention. The scope of the invention is not intended to be limited to the particular structure disclosed herein, but should instead be gauged by the breadth of the claims which follow.

What is claimed is:

1. A field emission device projection apparatus comprising:

a projector base having a light source, said light source comprising a field emission device panel;

means coupled to said panel for selectively providing, in a first mode, a video display image, and in a second mode, a backlighting source image for a transparency; and a lens system for projecting said images onto a surface separated from said apparatus.

2. The apparatus in accordance with claim 1 wherein said image providing means comprises a host system for generating image data and control signals to said panel.

3. The apparatus in accordance with claim 1 wherein said image providing means further includes switch means for providing operation selectively as said backlighting source for a transparency and as said video display image source.

4. The apparatus in accordance with claim 1 wherein said image providing means further includes switch means for providing concurrent operation as said backlighting source for a transparency and as said video display image source.

5. The apparatus in accordance with claim 1 wherein said backlighting source image is polychromatic.

6. The apparatus in accordance with claim 1 wherein said backlighting source image is monochromatic.

7. The apparatus in accordance with claim 1 wherein said video display image is polychromatic.

8. The apparatus in accordance with claim 1 wherein said video display image is monochromatic.

9. The apparatus in accordance with claim 1 wherein said backlighting source image includes features for enhancing the information content of a transparency.

10. The apparatus in accordance with claim 9 wherein said features comprise a pattern.

11. The apparatus in accordance with claim 1 wherein said video display image is animated.

\* \* \* \* \*